United States Patent
Kraft et al.

(10) Patent No.: US 6,463,278 B2
(45) Date of Patent: *Oct. 8, 2002

(54) TELEPHONE AUTOMATIC MODE SELECTION

(75) Inventors: Christian Kraft, Copenhagen (DK); Jan Haestrup, Copenhagen (DK)

(73) Assignee: Nokia Mobile Phones Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/037,786

(22) Filed: Mar. 10, 1998

(65) Prior Publication Data

US 2002/0107009 A1 Aug. 8, 2002

(30) Foreign Application Priority Data

Mar. 14, 1997 (GB) ............................................. 9705312

(51) Int. Cl.⁷ ................................................. H04M 3/00
(52) U.S. Cl. ........................ 455/418; 455/417; 455/566; 455/567
(58) Field of Search ................................ 455/426, 417, 455/413, 424, 412, 445, 418, 566, 567

(56) References Cited

U.S. PATENT DOCUMENTS

| | | | | |
|---|---|---|---|---|
| 5,128,981 A | * | 7/1992 | Tsukamoto et al. | 379/58 |
| 5,434,563 A | * | 7/1995 | Kudoh | 340/825.44 |
| 5,448,228 A | * | 9/1995 | Wagai et al. | 340/825.44 |
| 5,479,476 A | | 12/1995 | Finke-Anlauff | 379/58 |
| 5,506,888 A | * | 4/1996 | Hayes et al. | 455/445 |
| 5,739,764 A | * | 4/1998 | Ide et al. | 340/825.44 |
| 5,794,152 A | * | 8/1998 | Hikuma et al. | 455/502 |
| 5,815,081 A | * | 9/1998 | Motohashi | 340/825.44 |
| 6,317,593 B1 | * | 11/2001 | Vossler | 455/414 |

FOREIGN PATENT DOCUMENTS

| | | |
|---|---|---|
| EP | 0 611 070 A2 | 8/1994 |
| GB | 2 234 883 A | 2/1991 |
| WO | WO 90/04293 | 4/1990 |
| WO | WO 90/04841 | 5/1990 |

* cited by examiner

Primary Examiner—Lee Nguyen
(74) Attorney, Agent, or Firm—Perman & Green, LLP

(57) ABSTRACT

A portable phone has a controller with an associated storage for the storage of the setting for a plurality of functions which may be set individually by the user. The controller arranges the stored settings as groups which each define a phone mode selectable by the user. Each mode is associated with at least one control parameter. The controller is associated with at least one sensor for sensing said at least one control parameter, and it automatically selects the phone mode in response to the sensed control parameter.

28 Claims, 2 Drawing Sheets

TELEPHONE AUTOMATIC MODE SELECTION

BACKGROUND OF THE INVENTION

The invention relates to a method of automatically selecting the function setting mode of a phone, and to a portable phone for performing the method.

EP 611070 A describes a portable phone whose phone settings are stored in groups (modes) so that the user, when switching from one group to another, can switch several settings at a time. The user can hereby e.g. divert his phone, reduce the ringing strength, reduce the loudspeaker volume, turn on the display light when calling, etc. by a single operation.

WO 90/04841 discloses a radiophone system mounted in a car, in which the user indicates an event to the system by activating a push-button or by pronouncing a predetermined command to a speech recognition unit, following which the system responds by setting some parameters. The disclosed example shows how a police officer, when leaving the car, pushes the "Break" button, following which the volume is reduced and the public address system is turned on.

WO 90/04293 discloses a radiophone system mounted in a car and connected to a unit for determining the actual position of the car, which takes place by means of the LORAM system which is based on satellite signals. The system must at least contain a local database of the area in order to be able to identify whether the car is in an urban area or in the open country. This information is used for automatically adjusting the transmission power of the radiophone.

SUMMARY OF THE INVENTION

In accordance with the invention there is provided a method of automatically selecting function setting mode of a phone, said setting for a plurality of functions being set individually by the user and stored as groups which each define a phone mode selectable by the user, wherein at least one control parameter is associated with each selectable mode, and wherein said at least one control parameter is detected and the phone mode is selected automatically in response thereto and a portable phone having a controller with an associated storage for the storage of the setting for a plurality of functions which may be set individually by the user, wherein the controller arranges the stored settings as groups which each define a phone mode selectable by the user; wherein each selectable mode is associated with at least one control parameter; wherein the controller is associated with at least one sensor for sensing said at least one control parameter; and wherein the controller automatically selects the phone mode in response to the sensed control parameter.

The invention provides a method enabling the phone to automatically change its mode in response to its surroundings, each mode comprising several phone settings.

At least one control parameter is associated with each mode in the method of the invention, and when said at least one control parameter is detected, the mode of the phone is automatically selected in response thereto. The mode assumed by the phone may hereby be controlled by its position, real time and/or connection to accessories.

Cordless phones, such as DECT, and dual mode phones connected to both a cellular system and a cordless system will have rather precise information on their location through their knowledge of the base station which provides coverage at the moment. Since the cordless system usually covers a whole company, the employees will typically carry the phones on them when they move about. One or more base stations will typically cover the production area, others will cover the R/D area, while others again will cover common areas, such as canteen and conference rooms. The user can hereby define a phone setting mode and designate the control parameter as the ID of the cordless station, whereby the phone will assume this mode when it is covered by the base station concerned. The CPU of the phone is already informed of the ID of the cordless station which provides coverage at the moment.

Real time may also be used as a control parameter, as the user of the phone will typically use his phone both on duty and off duty. Here, the phone has an incorporated timer function, preferably with a weekday function, enabling definition of an off-duty mode where time and date constitute the control parameters. If the phone has an incorporated calendar function, e.g. with entered appointments, the calendar function together with the real time timer may be used for controlling the mode selection.

When various accessories are coupled, the detection of these may be used for controlling the mode of the phone. The phone detects already now if it is placed in a car kit in a car, and i.a. calls may then be answered automatically. This detection, however, may also be used for changing mode, so that the phone automatically sets ringing and sound volume at the level preselected for the mode. If the phone is a dual mode phone, it could expediently turn off the cordless part, as this part will no longer have coverage. At the same time, it could turn on the display light, as the light conditions inside a car are inferior to those outside.

Finally, the phone will frequently need to be connected to peripheral units to be able to receive fax and data calls. When the phone and the peripheral units are coupled, a handshaking procedure is performed to ensure that the units can exchange data. The CPU of the phone is already informed of the peripheral units and accessories which are connected, and this knowledge is therefore easy to use as control parameters in the automatic selection of mode.

BRIEF DESCRIPTION OF THE DRAWINGS

The invention will be explained more fully below in connection with preferred embodiments and with reference to the drawing, in which.

DETAILED DESCRIPTION OF THE INVENTION

Figure 1:
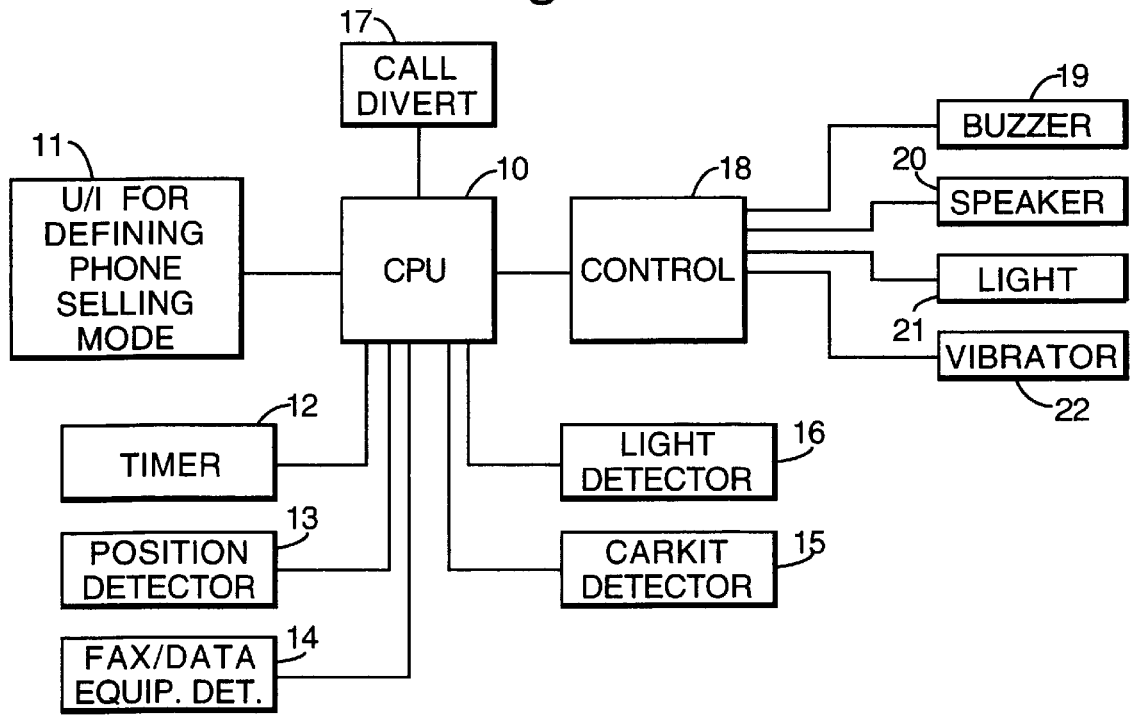
FIG. 1 shows a block diagram of a preferred embodiment of a radiophone according to the invention for automatic selection of phone setting mode.

The setting modes of a portable phone may comprise a considerable amount of user-defined parameters, such as call divert services, light, sound volume, call alert and ringing volume. The most frequently used phone settings are shown in table 1, in which the second column defines a function having a plurality of possible settings which are shown in the fourth column. The first and third columns contain numbers of the functions and phone settings shown in the second and fourth columns. It may be relevant in some connections to include other functions/phone settings and omit some of those shown.

TABLE 1 functions and phone setting options

| No. | function | No. | phone settings |
|---|---|---|---|
| 1 | call divert services | 1.1 | divert all voice calls |
|   |   | 1.2 | divert when not answered |
|   |   | 1.3. | divert when busy |
|   |   | 1.4 | divert if not reachable |
|   |   | 1.5 | divert all data calls |
|   |   | 1.6 | divert all fax calls |
|   |   | 1.7 | no diversions/cancel all diversions |
| 2 | light | 2.1 | on |
|   |   | 2.2 | off |
| 3 | keypad tones | 3.1 | level 1 |
|   |   | 3.2 | level 2 |
|   |   | 3.3 | level 3 |
|   |   | 3.4 | off |
| 4 | warning tones | 4.1 | on |
|   |   | 4.2 | off |
| 5 | ringing volume | 5.1 | level 1 |
|   |   | 5.2 | level 2 |
|   |   | 5.3 | level 3 |
|   |   | 5.4 | level 4 |
|   |   | 5.5 | level 5 |
| 6 | welcome note | 6.1 | standard |
|   |   | 6.2 | off |
|   |   | 6.3 | mode specific |
| 7 | sound volume | 7.1 | level 1 |
|   |   | 7.2 | level 2 |
|   |   | 7.3 | level 3 |
|   |   | 7.4 | level 4 |
|   |   | 7.5 | level 5 |
| 8 | call alert | 8.1 | ringing |
|   |   | 8.2 | ring once |
|   |   | 8.3 | beep once |
|   |   | 8.4 | silent |
| 9 | network | 9.1 | GSM and DECT |
|   |   | 9.2 | GSM |
|   |   | 9.3 | DECT |
| 10 | hands-free | 10.1 | hands-free |
|   |   | 10.2 | hands-free off |

Call divert services may comprise an unconditional diversion of all calls, which is expedient when the user of the phone is at a meeting. Alternatively, the user may decide to have all calls diverted when not answered. Here, he may choose to omit answering the call after having decided, on the basis of a displayed caller ID, whether to answer the call or to divert it by omitting to answer the call. It is also possible to divert call types, such as a fax or data calls. Here, it will be expedient if this took place on the basis of whether equipment for handling these call types is connected.

Traditional phone settings comprise i.a. on/off setting of display light. Precisely this feature consumes a good deal of energy, and considerable use of the feature will therefore result in a reduced overall standby time for the phone.

It should be noted here that, by means of the alert type, the user can get an audible indication of the current mode of the phone, and thus in some cases where the position of the phone determines the control parameters, also an indication of where he is.

The user may select several different levels and types of keypad tones in view of the surrounding noise level. Many users select keypad tones as a verification of the activation of a key. It is rather unpleasant to a user if the keypad tones of his phone are unduly noisy, because he will then attract attention when making a call.

Also the ringing volume and the sound volume from the loudspeaker of the phone may be selected at several different levels in view of the surrounding noise level. The same considerations apply here as to the keypad tones, in particular as regards sound volume, since a user rarely wants that his immediate surroundings can overhear the conversation.

Correspondingly, the call alert may be set at normal ringing, ring once, just beep, or silent, the user being then made aware of a call by means of a vibrator unit.

Hands-free answer to a call may be included as a phone setting and may, together with several other settings, be used in a driving mode. Hands-free answer to a call may also be included in other modes, e.g. controlled by the detection of a head set.

TABLE 2 modes and functions with selected phone setting options.

| mode/function | 1 | 2 | 3 | 4 | 5 | 6 | 7 | 8 | 9 | 10 |
|---|---|---|---|---|---|---|---|---|---|---|
| 1. default | 7 | 2 | 2 | 1 | 3 | 1 | 3 | 1 | 1 | 2 |
| 2. office | 2, 5, 6 | 2 | 1 | 1 | 2 | 3 | 3 | 1 | 1 | 2 |
| 3. meeting | 1, 5, 6 | 2 | 4 | 2 | 1 | 3 | 1 | 4 | 1 | 2 |
| 4. factory | 5, 6 | 2 | 3 | 2 | 5 | 3 | 5 | 1 | 1 | 2 |
| 5. off-duty | 4 | 2 | 2 | 1 | 4 | 3 | 3 | 1 | 2 | 2 |
| 6. driving | 5, 6 | 1 | 2 | 2 | 5 | 3 | 5 | 2 | 2 | 1 |
| 7. connected to pc | 2 | 2 | 2 | 1 | 3 | 2 | 2 | 1 | 1 | 2 |

It will be seen from table 2 how a phone may be designed with e.g. seven modes: default, office, meeting, factory, off-duty, driving and connected to PC. The functions in the top horizontal line refer to the ten functions which appear from the second vertical column in table 1. The selected settings for the functions are shown opposite the associated mode name. It will thus be seen that several settings may be selected for one function if these are not mutually inconsistent.

TABLE 3 modes and control parameters

| Mode / control parameter | base station | timer | car kit | pc connected |
|---|---|---|---|---|
| 1. default | — | — | — | — |
| 2. office | — | WD 8–16 | — | — |
| 3. meeting | #238 | WD 8–16 | — | — |
| 4. factory | #240, #241 | WD 8–16 | — | — |
| 5. off-duty | — | non WD 8–16 | — | — |
| 6. driving | — | — | detected | — |
| 7. connected to pc | — | — | — | detected |

Table 3 shows an example of how modes may be selected by means of control parameters. A non-editable default mode is entirely without control parameters, and the telephone will assume this mode when other modes are not positively designated by the control parameters, or when the default mode is selected manually. Three working modes are selected to be included in the normal on-duty hours, e.g. 8 a.m. to 4 p.m. on all working days (Monday–Friday). Thus, it is the position of the phone which determines which of the three modes is to be used at the moment. Outside this period of time, the phone will be in off-duty mode, unless accessory is detected.

FIG. 1 shows a preferred embodiment of the circuit for phone mode selection according to the invention. The phone, which is a dual mode phone, comprises a CPU 10 which handles the network connections of the phone, including the current monitoring of networks in idle mode, roaming from one cell to another and call set-up. When a dual mode phone (phone connectable to both a cellular network and a cordless network) is involved, as is the case here, the CPU also controls the communication of the phone with the two networks.

The normal user interface 11 of the phone, which comprises a display and a keypad, may be used for defining new phone setting modes and editing and erasing existing phone setting modes. In the preferred embodiment, the phone will be designed with a standard mode by the manufacturer, and this mode is not associated with any control parameters, and, accordingly, it can only be reached manually, or when the control parameters do not enable any of the other modes.

Together with a control circuit 18, the CPU 10 will usually be integrated in the chip set of the phone. The control circuit 18 is shown in an assembled state to facilitate the understanding of the invention, although this will usually not be the case. Via the control circuit 18, the CPU 10 adjusts the volume of a buzzer 19 and a speaker 20, and turns on and off a display light 21 and an associated vibrator, which takes place in response to the mode selection.

Furthermore, the phone is adapted to automatically inform the operator of either the cellular network, the cordless network or both networks that incoming calls are to be diverted to another number. This number will be encoded when upon establishment of a mode if diversion has been selected. The actual divert procedure takes place in a manner known per se via transmission of a message to the operator, but is shown in FIG. 1 as a box 17 like the purely internal functions, such as ringing and sound volume, light, etc.

The telephone is connected to a plurality of units which generate control parameters, and which supply signals capable of serving as control parameters. The first one of these units is a timer 12 which, together with the CPU 10, supplies a representation of time and weekday.

Since, in the preferred embodiment, the phone is a so-called dual mode phone, which means that it can also monitor the activity of both a cellular network, such as GSM, and a cordless network, such as DECT, the CPU 10 will know precisely which base stations it listens to and thus know its relative position rather precisely, as long as the cordless network provide coverage. The phone is capable of listening to several stations (both cordless and cellular) at a time, which may improve the positional determination. The position detector 13 is hereby integrated in the CPU itself or the storage location in which the CPU saves this information.

The phone may have a light detector 16 which detects the light conditions around the phone. The light diode, which illuminates the display via a light guide, may perform this function in practice, as its dark current is a measure of the incident light. The advantage of using the existing diode is that then it is the light conditions of the display which are measured. The light is turned on only in case of either a network activity (e.g. an incoming call) or a user activity where the keypad or the like is touched.

Already at the present time, the CPU of the phone is capable of registering whether the phone is placed in a car kit holder, as the phone, when this is the case, automatically answers an incoming call, without the driver having to remove this hands from the wheel. This information is used in the preferred embodiment for initiating the driving mode, which, in addition to the hands-free function, may comprise diversion of data/fax calls, adjustment of ringing volume, sound volume and turning-on of display light.

The coupling between the phone and the peripheral units involves a handshaking procedure to ensure that the units can exchange data. Thus, the CPU of the phone will have information on which peripheral units and accessories are connected, and this knowledge is therefore easy to use as control parameters in the automatic mode selection.

It is noted that some control parameters can also designate two different modes, which will be the case when the phone is placed in the car kit during working hours. The parameters must therefore be weighted mutually so that the car kit detection overrules the time, as there is no sense in that the phone enters the office mode when it is present in a car.

Figure 2:
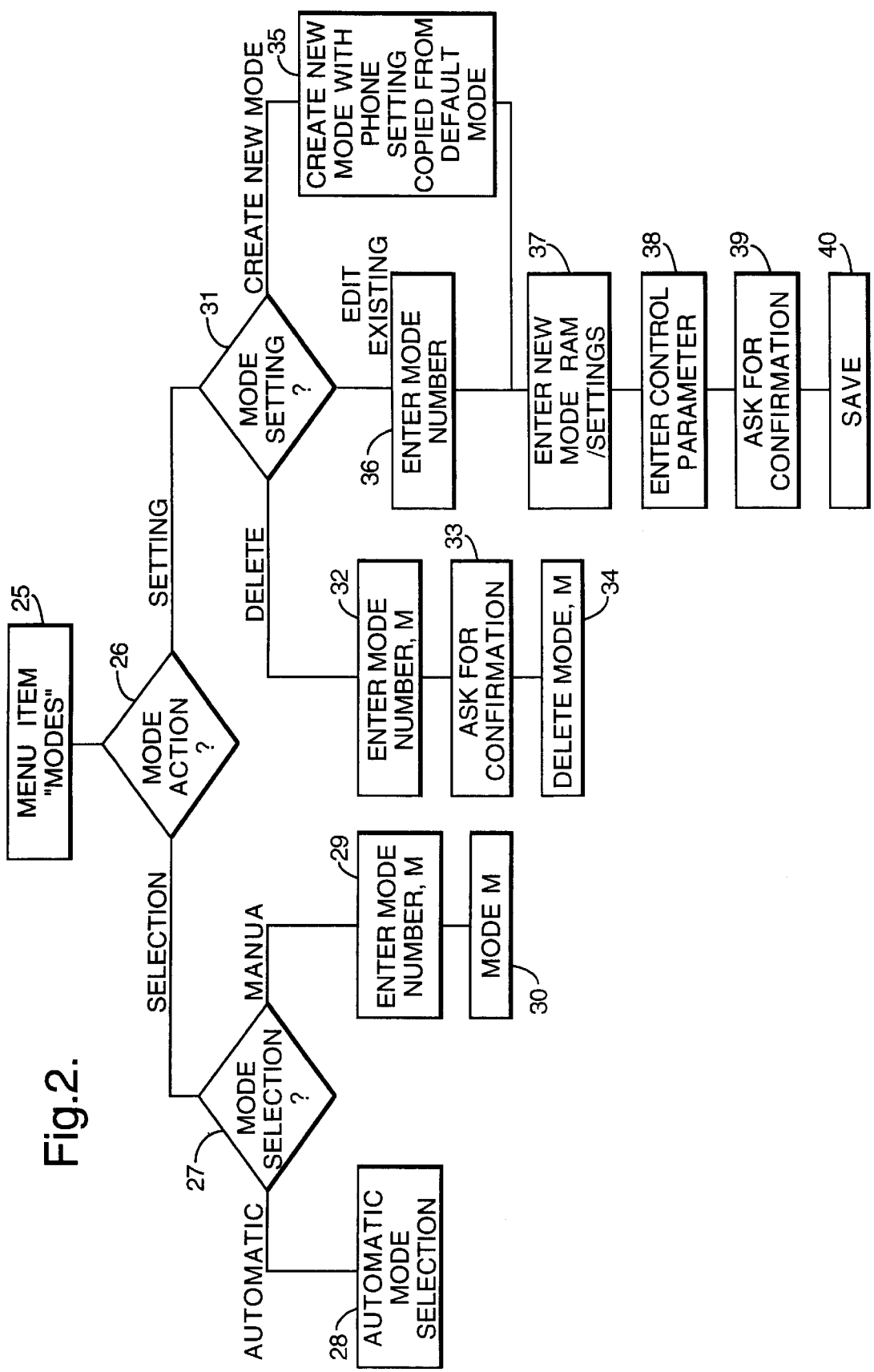
FIG. 2 schematically shows a flow diagram illustrating how a mode is selected automatically according to the invention.

The phone has a menu structure in a manner known per se. This menu structure will not be explained in detail in the following description which highlights one of the menu items—viz. "modes", which appears from FIG. 2. If the "modes" item in stage 25 is selected in the menu, two selectable submenus will be displayed—either simultaneously or successively. This selection is indicated by the box 26. It should be noted of course that "modes" does not have to be included in the existing menu structure, but may instead be activated by a separate access key.

The user may choose with the first item "selection" whether the mode selection is to take place manually or automatically. This is indicated by the box 27. If the user here selects automatic mode selection 28, the CPU checks the control parameters and selects mode in response thereto. The phone then returns to the main menu with the menu item "modes" display text (stage 25).

If manual mode selection is selected, it is asked in stage 29 which mode the user wants, and here "default" mode is suggested as default. If the user then selects this or another mode, the phone remains in this mode until another is selected or until the automatic mode selection is selected. The phone then returns to the main menu with the menu item "modes" display text (stage 25).

The user may edit or amend the existing group of modes by means of the other item. If "mode amendment" is selected, then in stage 31 the user has the option of creating a new mode ("create new mode"), deleting an existing mode ("delete existing mode") or editing the parameters in an existing mode ("edit existing mode"). These three selectable items are displayed—either simultaneously or successively.

If the user decides to delete an existing mode, he is asked in stage 32 to state which mode he wants to delete. When he has stated the mode number, M, which may have been entered or created through a selection after the user has scrolled through the mode menu, the user is asked in stage 33 to confirm that the designated mode is to be deleted. When the user has confirmed this, the mode is deleted in stage 34, and the phone returns to the main menu with the menu item "modes" display text (stage 25).

If the user wants to create a new mode in stage 31, the CPU generates a new mode ID number and copies the name of the default mode and the phone settings as existing name and phone settings for the new mode, which takes place in stage 35. Then the creation of the new mode is processed as an editing of an existing mode.

If editing of an existing mode had been-selected in stage 31, the user would have been asked in stage 36 to designate the mode he wanted to edit. This mode selection may take place like in the "delete" stage 32. In stage 37 the user may make the amendments he wants, the existing mode name and the existing phone settings being proposed as default en route. The mode name and the functions shown in the second column in table 1 will successively be shown in the display of the phone together with default phone settings. If the user wants another phone setting than the default suggestion, he may scroll through the possible phone settings, some of which appear from the fourth column in table 1.

When the user has selected the phone setting of a mode, he is asked in stage 38 to state which parameters he wants to be used as control parameters. These may be the base station ID for the cordless network, timer output, car kit connection or PC connection. Here the user will be asked whether he wants to use the cordless network base station ID as a control parameter. If the user wants this, the covering base station will be suggested. Otherwise, the user must manually enter the ID of the desired base station. This knowledge will be available from the operator who is responsible for the day-to-day running of the cordless network.

The user may also decide to perform the mode selection by means of a timer, and if so, the phone will request a start time for the mode Monday and allows the user to proceed ("next day"). If the user selects "next day", the phone instead requests a start time Tuesday. If, on the other hand, the user states and selects a start time, the phone requests an end time for the mode Monday and allows the user to proceed. This is continued until a whole week is covered, so that the mode control will take place with a periodicity of one week. If the user enters start and end time for a day, the same start and end time will be suggested as default for the next day. Of course, this will also be the case if a mode is started and ended on two succesive days (i.e. continues through the night).

The applicant has recently marketed a unit "Nokia Communicator 9000,®", in which a lap top/palm top is integrated with a hand-portable phone. The phone will thus have access to a calendar system in which e.g. meetings may be entered. This information, together with the real time information, may be used for initiating the meeting mode.

Finally, the detection of accessories may be used for selecting mode. In this case, this will merely be a simple control in response to whether accessories are detected or not.

In connection with the definition of control parameters, the phone will ask whether the user accepts that the accessory detection overrules the time and position control parameters, and that the position control parameter overrules the time control parameter. The user may define another weighting between the parameters to give the most optimum mode selection for him.

Finally, the user is asked whether he can confirm that the amendments made are to be introduced into the original mode. If the user confirms in stage 39, the amendments are saved in stage 40, and the phone reverts to the main menu with the menu item "modes" display text (stage 25).

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A portable phone having a controller with an associated memory for storing individually adjusted settings for each of a plurality of functions of the phone;
   wherein the controller stores each of the individually adjusted settings for the plurality of functions in a group, the controller being adapted to form a plurality of groups, each group including a set of stored settings, wherein each group defines a phone mode selectable by the user; wherein the controller is associated with a timer unit integrated in the phone and a calendar function integrated in the phone; and
   wherein the controller compares clock information from the timer unit with data from the calendar function and automatically selects the phone mode in dependence of this comparison, and
   wherein the controller is further adapted to selected a phone mode based on a user input independent of the clock information and the calendar function.

2. A portable phone according to claim 1, wherein the number of functions comprises phone setting features and call divert features.

3. A portable phone according to claim 1, wherein at least two modes comprise a default mode set by the manufacturer of the phone and at least one mode in which the functions may be set by the user.

4. A portable phone according to claim 1, wherein the default mode is set as default by the generation of a user-defined mode.

5. The portable phone of claim 1 wherein each group includes settings for at least two functions of the phone and one of the settings comprises a setting for a ringing volume function.

6. The portable phone of claim 5 wherein at least one of the stored settings includes a setting for a call divert function, a phone light function, a keypad tone function, a warning tone function, a welcome note function, a sound volume function, a call alert function, a network setting function or a hands-free option setting function.

7. The portable phone of claim 1 wherein each group includes at least two individually adjusted settings for functions of the phone, wherein the functions are call divert services, phone lighting, keypad tones, warning tones, ringing volume, welcome notes, sound volume, call alert, network settings or hands-free operation.

8. The portable phone of claim 1 wherein each group includes an identical set of functions and wherein a setting for a function in one group is different for a setting for the same function in another group.

9. A portable phone having a controller with an associated memory for storing individually adjusted settings for each of a plurality of functions for the phone, the controller being adapted to:
   arrange the stored settings in a group and form different groups of stored settings, each group being selectable by the user;
   control a transmitter/receiver unit adapted to communicate with a cordless network;
   receive information from the cordless network on a base station to which the phone is connected at the moment, and automatically select the group in response to the information received from the base station; and
   wherein the controller is further adapted to override the automatically selected group and substitute a group manually selected by the user.

10. The portable phone of claim 9, wherein the phone is further adapted to:
    monitor clock information supplied by a timer unit;
    compare the clock information with data from a calendar function integrated in the phone; and
    automatically select one of the groups for use in controlling the portable phone in dependence of the comparison of the clock information to the calendar function.

11. The portable phone of claim 9 wherein each group includes individually adjusted settings for at least two functions of the phone, where the functions are call divert services, phone lighting, keypad tones, warning tones, ringing volume, welcome notes, sound volume, call alert, network settings or hands-free operation.

12. The portable phone of claim 9 wherein each group includes settings for at least two functions of the phone and one of the settings is a setting for a ringing volume function.

13. The portable phone of claim 9 wherein the functions stored in each group are identical and a setting for a function in one group is different from a setting for the same function in another group.

14. A portable phone having a plurality of user adjustable operating characteristics and means for adjusting said operating characteristics comprising:

means for defining a plurality of groups of said operating characteristics, wherein each said group includes a plurality of said user adjustable operating characteristics; and means for applying a user selected setting from a range of possible settings to each of the characteristics in each group;

means for selecting one of said defined plurality of groups for controlling an operation of said portable phone; and wherein said selecting means includes a controller adapted to:

control a transmitter/receiver adapted to communicate with a cordless network;

receive information from the cordless network on a base station to which the phone is connected at the moment; and automatically select a particular group in response to the information on the cordless base station, and wherein the controller is further adapted to override the automatically selected group and substitute a group manually selected by the user.

15. A portable phone according to claim 14, wherein the operating characteristics comprise phone setting features and call divert features.

16. A portable phone according to claim 14, wherein at least two modes of the phone comprise a default mode set by the manufacturer of the phone and at least one mode in which the functions may be set by user.

17. A portable phone according to claim 16, wherein the default mode is set as default by the generation of a user-defined mode.

18. A portable phone having a plurality of user adjustable operating characteristics and means for adjusting said operating characteristics comprising:

means for defining a plurality of groups of said operating characteristics, wherein each said group includes a plurality of said user adjustable operating characteristics and means for applying a value to each operating characteristic, the value being selected from a range of values;

a controller adapted to automatically select one of the groups for controlling the operation of the phone in dependence of a sensed control parameter;

wherein the controller is further adapted to:

control a transmitter/receiver unit adapted to communicate with a cordless network;

receive information from a cordless connection on a base station to which the phone is connected at the moment; and select the group in response to the information on the cordless base station concerned, and wherein the controller is further adapted to override the automatically selected phone mode and substitute a group manually selected by the user.

19. A method for modifying user adjustable characteristics of a portable phone adapted to communicate with a cordless network, the phone having a plurality of operating characteristics, the method comprising the steps of:

defining a plurality of groups, each group having a plurality of user adjustable characteristics; and inputting values for individual ones of the user adjustable characteristics;

wherein the phone receives information from the cordless network on a base station to which it is connected at the moment and senses at least one control parameter included in the information by means of at least one sensor, and wherein a group is automatically identified in response to the information;

a user is prompted to select the identified group in response to the sensed control parameter; and wherein a user can override the automatically identified group by manually selecting another group independent of any sensed control parameter.

20. A method of automatically selecting a user defined phone mode of a phone, the method comprising the steps of:

storing one or more selected functions of the phone in a group, wherein each function includes one or more user-defined parameters that are individually adjusted by the user;

defining each group as a mode of the phone, wherein the phone can include a plurality of modes;

defining one or more control parameters that can be used to activate at least one of the modes;

activating one of the modes by detecting one or more of the control parameters wherein each function of the phone automatically reverts to the user adjusted parameter associated with the mode in a single operation; and wherein the activated phone mode can be replaced by a user designated mode without regard for the control parameters.

21. The method of claim 20 wherein the step of activating further comprises the steps of:

monitoring clock information being supplied by a timer unit integrated in the phone;

comparing the clock information with data from a calendar function integrated into the phone; and automatically activating the mode in dependence of the clock information and the data from the calendar function.

22. A method of automatically changing settings of user adjustable characteristics of a phone, the method comprising the steps of:

defining a plurality of groups of the phone wherein each group includes a plurality of individually adjusted operating characteristics of the phone;

individually adjusting each characteristic in each group to a user defined setting and storing the adjusted characteristics;

associating each group with an operating mode of the phone;

detecting a change in a surrounding environment of the phone; and switching a current mode of the phone to a mode associated with the surrounding environment, wherein each current setting of each operating characteristic of the phone automatically changes to the setting associated with the mode.

23. The method according to claim 22 further comprising the step of automatically selecting one of the groups for use in controlling the phone in dependence of an appointment function, wherein the phone is adapted to monitor clock information being supplied by a timer unit and compare the clock information with data from a calendar function integrated in the phone in order to determine the appointment function.

24. The method of claim 22 wherein the operating modes of the phone include a default mode, an office mode, a meeting mode, a factory mode, a driving mode and a connected to PC mode.

25. The method of claim 22 wherein the settings of the operating characteristics of the phone simultaneously change to the settings associated with mode corresponding to the surrounding environment.

26. The method of claim 22 further comprising the steps of:

prompting a user with a query that the surrounding environment has changed and a mode associated with a new surrounding environment is available to be selected; and selecting the new mode by manual activation.

27. The method of claim 22 wherein the operating characteristic of the phone includes call divert services, phone lighting, keypad tones, warning tones, ringing volume, welcome notes, sound volume, call alert, network settings and hands-free option setting.

28. A portable phone having a controller with an associated memory for storing individually adjusted settings for each of a plurality of functions for the phone, the controller being adapted to:

arrange the stored settings in groups wherein each group includes settings for at least two functions of the phone, one of the at least two functions comprising a ringing volume and wherein another of the at least two functions is a call divert service, a phone light, a keypad tone, a warning tone, a welcome note, a sound volume, a call alert, a network setting or a hands-free option setting; and the controller is further adapted to:

control a transmitter/receiver unit adapted to communicate with a cordless network;

receive information from the cordless network on a base station to which the phone is connected at the moment, and automatically select one of the groups in response to the information received from the base station; and wherein the controller is further adapted to override the automatically selected group and substitute a group manually selected by the user.

* * * * *

UNITED STATES PATENT AND TRADEMARK OFFICE
CERTIFICATE OF CORRECTION

PATENT NO.     : 6,463,278 B2
DATED          : October 8, 2002
INVENTOR(S)    : Kraft et al.

It is certified that error appears in the above-identified patent and that said Letters Patent is hereby corrected as shown below:

Title page, Item [54] and Column 1, line 1,
"TELEPHONE AUTOMATIC MODE SELECTION" should read -- TELEPHONE WITH AUTOMATIC MODE SELECTION --.

Column 8,
Line 15, "claim 1" should read -- claim 3 --.

Signed and Sealed this

Seventeenth Day of June, 2003

JAMES E. ROGAN
*Director of the United States Patent and Trademark Office*